United States Patent
Rodriguez Bravo et al.

(10) Patent No.: US 12,106,304 B2
(45) Date of Patent: Oct. 1, 2024

(54) TRANSACTION AUTHORIZATION

(71) Applicant: Kyndryl, Inc., New York, NY (US)

(72) Inventors: Cesar Augusto Rodriguez Bravo, Alajuela (CR); David Alonso Campos Batista, Heredia (CR); Sarbajit K. Rakshit, Kolkata (IN)

(73) Assignee: Kyndryl, Inc., New York, NY (US)

( * ) Notice: Subject to any disclaimer, the term of this patent is extended or adjusted under 35 U.S.C. 154(b) by 66 days.

(21) Appl. No.: 17/010,044

(22) Filed: Sep. 2, 2020

(65) Prior Publication Data
US 2022/0067744 A1    Mar. 3, 2022

(51) Int. Cl.
| | |
|---|---|
| G06Q 10/10 | (2023.01) |
| G06F 3/01 | (2006.01) |
| G06Q 20/18 | (2012.01) |
| G06Q 20/40 | (2012.01) |
| G06Q 50/00 | (2012.01) |
| G06Q 50/18 | (2012.01) |
| G06T 7/20 | (2017.01) |
| G06V 40/16 | (2022.01) |
| G06V 40/19 | (2022.01) |

(52) U.S. Cl.
CPC ....... G06Q 20/40145 (2013.01); G06F 3/013 (2013.01); G06Q 10/10 (2013.01); G06Q 20/18 (2013.01); G06Q 20/4016 (2013.01); G06Q 50/01 (2013.01); G06Q 50/18 (2013.01); G06T 7/20 (2013.01); G06V 40/172 (2022.01); *G06T 2207/30201* (2013.01)

(58) Field of Classification Search
None
See application file for complete search history.

(56) References Cited

U.S. PATENT DOCUMENTS

| | | | | |
|---|---|---|---|---|
| 9,305,298 | B2 * | 4/2016 | Wilson | H04L 9/0822 |
| 10,255,595 | B2 * | 4/2019 | Van Os | G06Q 20/3224 |
| 10,282,533 | B2 * | 5/2019 | Lindemann | G06Q 20/3278 |
| 10,552,676 | B2 * | 2/2020 | Shroff | G06V 40/193 |
| 10,783,576 | B1 * | 9/2020 | Van Os | G06Q 20/3227 |
| 11,037,149 | B1 * | 6/2021 | Barakat | G06Q 20/401 |

(Continued)

FOREIGN PATENT DOCUMENTS

| | | |
|---|---|---|
| CN | 104020582 B | 9/2018 |
| JP | 6020576 B2 | 11/2016 |

(Continued)

OTHER PUBLICATIONS

Kagan, J., "Contactless Payment", Updated May 29, 2020, 14 pages <https://www.investopedia.com/terms/c/contactless-payment.asp>.

(Continued)

*Primary Examiner* — Christopher Bridges
*Assistant Examiner* — Tony P Kanaan
(74) *Attorney, Agent, or Firm* — Erik Swanson; Andrew M. Calderon; Calderon Safran & Wright, P.C.

(57) ABSTRACT

Aspects of the present disclosure relate to transaction authorization. Image data of a user can be received while a transaction occurs. The image data can be analyzed to determine whether the user viewed a display indicating characteristics of the transaction. The transaction can be authorized in response to determining that the user viewed the display indicating the characteristics of the transaction.

19 Claims, 6 Drawing Sheets

(56) References Cited

U.S. PATENT DOCUMENTS

| | | | |
|---|---|---|---|
| 2007/0073619 A1* | 3/2007 | Smith | G07C 9/257 705/41 |
| 2013/0275309 A1* | 10/2013 | Kwong | G06Q 20/4012 348/78 |
| 2014/0025583 A1* | 1/2014 | McNeal | G06Q 20/34 705/67 |
| 2014/0289834 A1* | 9/2014 | Lindemann | G06Q 20/425 726/7 |
| 2014/0333795 A1* | 11/2014 | Chen | G06F 3/013 348/222.1 |
| 2015/0049004 A1* | 2/2015 | Deering | H04N 13/344 345/8 |
| 2015/0178702 A1* | 6/2015 | Patel | G07F 9/001 705/21 |
| 2015/0199006 A1* | 7/2015 | He | A61B 3/113 345/158 |
| 2016/0048866 A1* | 2/2016 | Li | G06Q 30/0242 705/14.41 |
| 2018/0039990 A1* | 2/2018 | Lindemann | G06V 40/19 |
| 2018/0247038 A1* | 8/2018 | Lindemann | G06F 21/32 |
| 2018/0276673 A1* | 9/2018 | Van Os | G06Q 20/227 |
| 2018/0293608 A1* | 10/2018 | Li | G06F 3/0488 |
| 2018/0373859 A1* | 12/2018 | Ganong | G06F 21/64 |
| 2019/0164156 A1* | 5/2019 | Lindemann | G06Q 20/4016 |
| 2019/0215422 A1* | 7/2019 | Bertuca | H04N 23/50 |
| 2019/0238743 A1* | 8/2019 | Kim | G06T 3/047 |
| 2019/0370781 A1* | 12/2019 | Van Os | G06Q 20/3223 |
| 2020/0005320 A1* | 1/2020 | Sarin | G06Q 20/3223 |
| 2021/0081952 A1* | 3/2021 | Rakshit | G06Q 20/405 |
| 2021/0081953 A1* | 3/2021 | Rakshit | G06Q 20/405 |
| 2021/0279692 A1* | 9/2021 | Trionfi | G06Q 10/10 |
| 2021/0398188 A1* | 12/2021 | Jafa | G06V 40/165 |

FOREIGN PATENT DOCUMENTS

| | | |
|---|---|---|
| KR | 1020090074114 A | 7/2009 |
| KR | 101455609 B1 | 10/2014 |
| KR | 1020160090867 A | 8/2016 |

OTHER PUBLICATIONS

Chai, C., "Contactless cards: How they work", Nov. 14, 2017, 8 pages <https://www.creditcards.com/credit-card-news/how-contactless-cards-work.php>.

Unknown, "Tap to pay with Visa. Just like that.", printed Jul. 21, 2020, 10 pages <https://www.visa.co.in/pay-with-visa/featured-technologies/visa-paywave.html>.

Unknown, "Vista Imaging VistaEY2P", Biometric Supply, printed Jul. 21, 2020, 2 pages <https://www.biometricsupply.com/product/vista-imaging-vistaey2p/>.

Unknown, "Human field of view (FOV) for both eyes showing different levels of peripheral vision", printed Jul. 21, 2020, 4 pages <https://www.researchgate.net/figure/Human-field-of-view-FOV-for-both-eyes-showing-different-levels-of-peripheral-vision_fig1_331409336>.

Sullivan, D., "New glasses lens technology can increase peripheral vision.", printed Jul. 21, 2020, 5 pages <https://blueridgevision.com/content/new-study-aims-reduce-peripheral-vision-loss>.

Unknown, "1 Uds azul OV7670 300KP VGA modulo de la camara para arduino DIY Kit", AliExpress, printed Jul. 21, 2020, 15 pages.

Unknown, "TPS575 Smart Mini Cash Register", Telpo, printed Jul. 21, 2020, 12 pages <https://www.telpo.com.cn/mobile-pos/dual-screen-desktop-smart-pos-with-barcode-scanner.html>.

Lacmanovic et al., "Contactless payments based on Near Field Communication Technology", E-Society Journal: research and applications—vol. 2, No. 2, Nov. 2011, 10 pages.

Mell et al., "The NIST Definition of Cloud Computing", Recommendations of the National Institute of Standards and Technology, Sep. 2011, 7 pages.

* cited by examiner

TRANSACTION AUTHORIZATION

BACKGROUND

The present disclosure relates generally to the field of transaction authorization, and in particular, to image based transaction authorization.

Transactions, such as financial transactions, contracts, and policies, can be electronically executed (e.g., whereby parties use one or more electronic resources to facilitate the transaction). This can allow convenient and remote execution of transactions.

SUMMARY

Embodiments of the present disclosure relate to a method, system, and computer program product for transaction authorization. Image data of a user can be received while a transaction occurs. The image data can be analyzed to determine whether the user viewed a display indicating characteristics of the transaction. The transaction can be authorized in response to determining that the user viewed the display indicating the characteristics of the transaction.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
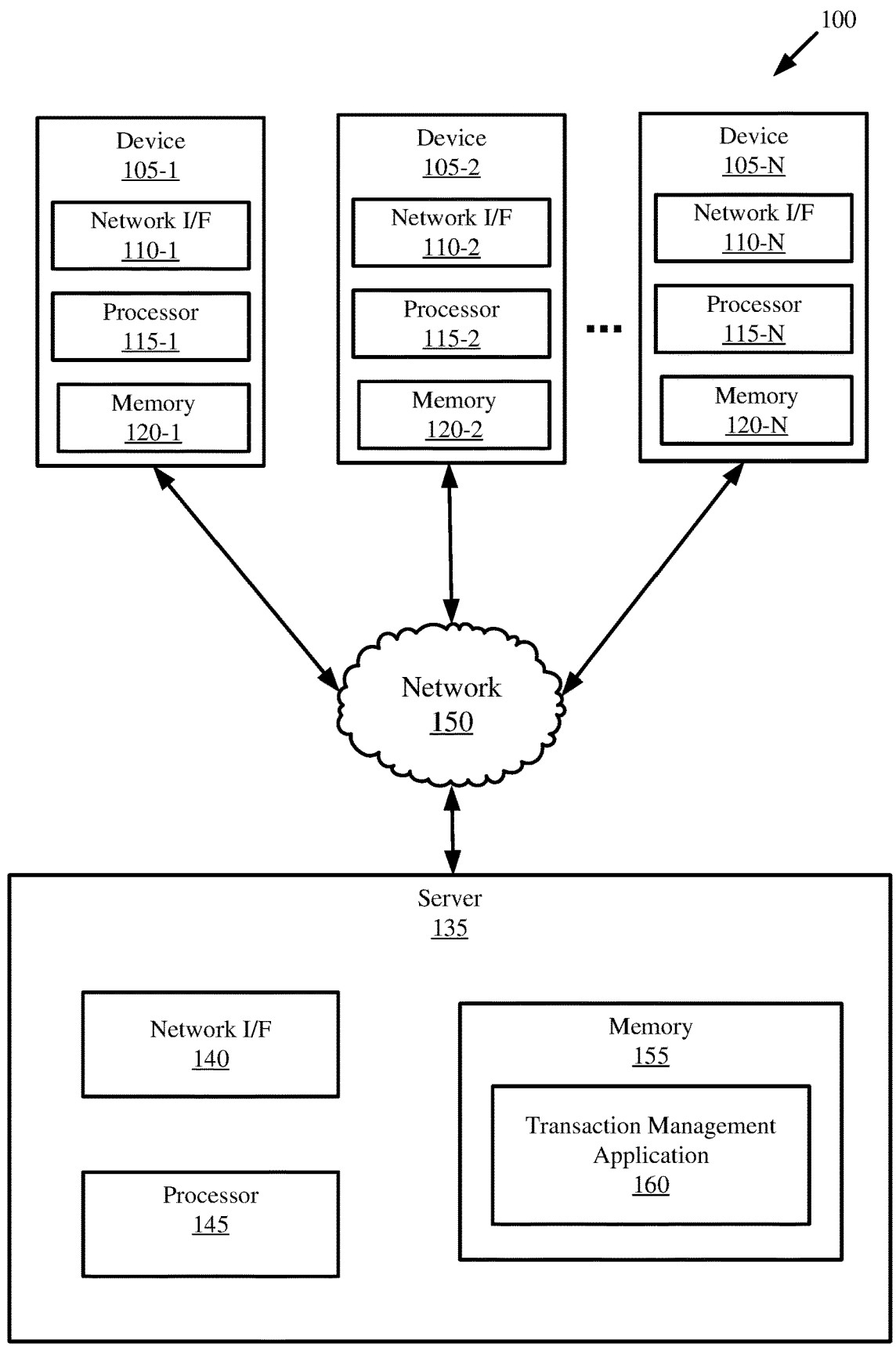
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of transaction authorization, and in particular, to image based transaction authorization. While the present disclosure is not necessarily limited to such applications, various aspects of the disclosure can be appreciated through a discussion of various examples using this context.

Transactions, such as financial transactions, contracts, and policies, can be electronically executed (e.g., whereby parties use one or more electronic resources to facilitate the transaction). This can allow convenient and/or remote execution of transactions. However, security issues are commonplace in electronic transactions. For example, fraudulent activity such as theft and forgery can occur during electronic financial transactions, contract execution, and/or policy execution. Further, users frequently do not fully understand a transaction (e.g., the terms and conditions) while it is being executed. For example, in a financial transaction, a user may authorize (e.g., via a magnetic strip, EMV chip, or near-field communication (NFC) tap) a payment for the wrong amount and be tasked with seeking a refund (e.g., through a merchant or their bank). As another example, when executing a contract or policy, a user may not thoroughly read the terms they are agreeing to and may regret agreeing to certain terms or conditions. Solutions are needed to enhance the security of electronic transactions and further ensure that users understand characteristics of the transactions they are involved in.

Aspects of the present disclosure address the aforementioned complications via image based transaction authentication. Image data of a user can be received while a transaction occurs. The image data can be analyzed to determine whether the user viewed a display indicating characteristics of the transaction. The transaction can be authorized in response to determining that the user viewed the display indicating the characteristics of the transaction.

The aforementioned aspects provide transaction authorization for users only when they have viewed a display indicating characteristics of the transaction. This can reduce the occurrence of completed transactions that a user unintentionally approves when they have not viewed characteristics of the transaction, such as an incorrect payment amount and/or unfavorable terms/conditions. Further still, by capturing image data of the user while the transaction is occurring, authentication of the user can be completed (e.g., using facial recognition). This can reduce fraudulent activity such as theft and forgery that can occur throughout transactions.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, financial transaction terminals, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 5.

The server 135 includes a transaction management application 160. The transaction management application 160 can be configured to authorize transactions (e.g., contracts, policies, financial transactions, real estate transactions, etc.) initiated by users. The transaction management application 160 can be configured to receive image data of a user while they are executing (e.g., reading a document, providing a signature, providing payment, accepting terms, etc.) a transaction. A determination can be made whether the user is viewing a display (e.g., by performing eye-tracking analysis on the image data) indicating characteristics (e.g., terms, conditions, payment amounts, etc.) of the transaction. If a determination is made that the user viewed the display indicating characteristics of the transaction, the transaction can be approved. If a determination is made that the user did not view the display indicating characteristics of the transaction, the transaction can be declined.

In embodiments, the transaction management application 160 can be deployed on (e.g., provisioned, installed on, or otherwise shared with) devices 105 such that devices 105 can execute one or more functionalities of the transaction management application 160. In some embodiments, the devices 105 can transmit image and/or other relevant authorization data (e.g., eye-tracking data, authentication data, location data, transaction history data, transaction characteristics, social media data, device security data, and others) to the server 135 such that the server 135 can process the data for the devices 105. Examples of devices 105 that the transaction management application 160 can be utilized on include mobile devices (e.g., tablets and smart phones), desktop computers, financial transaction terminals, and wearables, among others.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
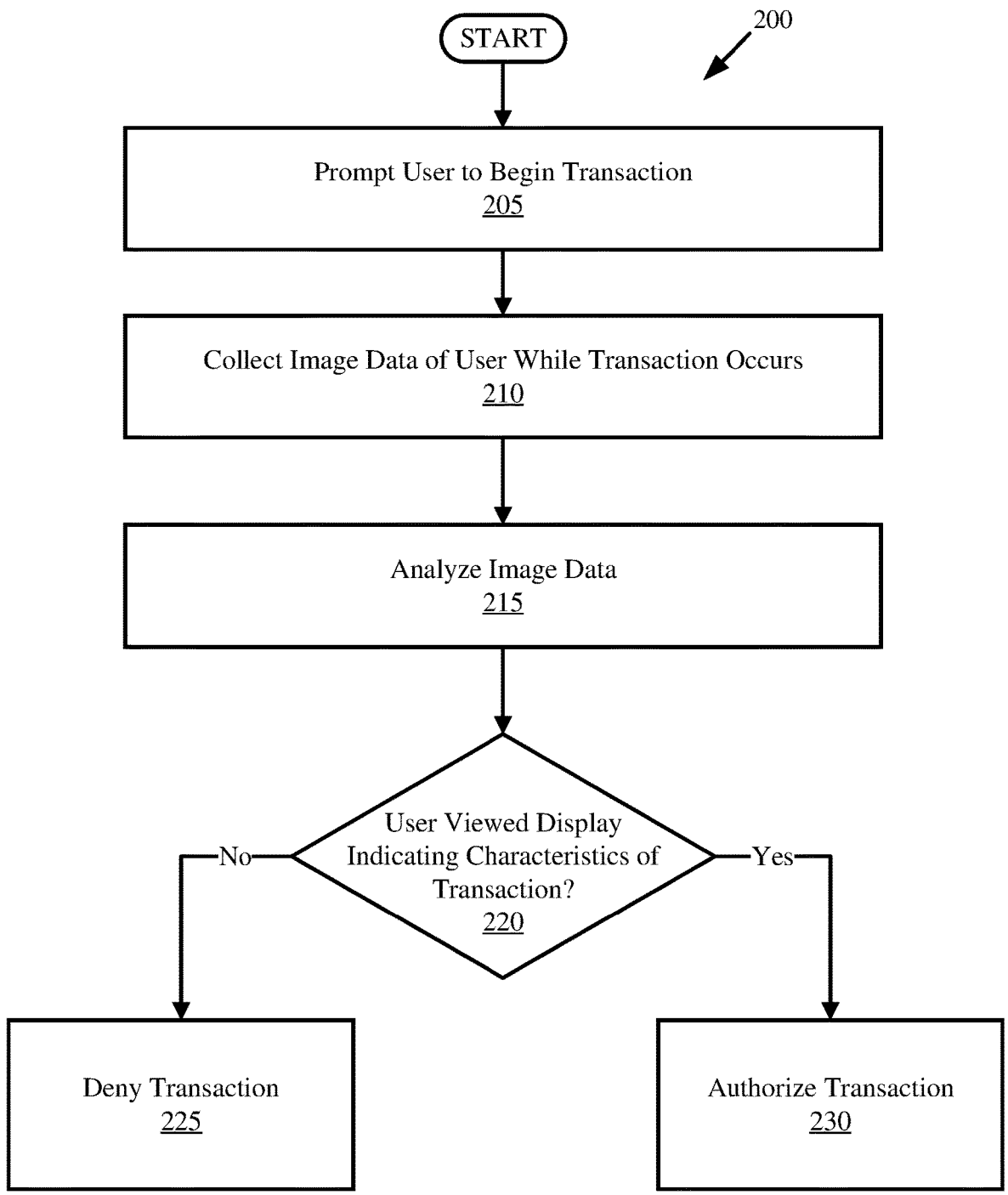
FIG. 2 is a flow-diagram illustrating an example method for authorizing a transaction based on image data, in accordance with embodiments of the present disclosure.

Referring now to FIG. 2, shown is a flow-diagram illustrating an example method 200 for authorizing a transaction (e.g., by transaction management application 160 of FIG. 1) based on image data, in accordance with embodiments of the present disclosure. One or more of the operations described in FIG. 2 can be executed by a computer system, such as devices 105 and server 135 of FIG. 1.

Method 200 initiates at operation 205, where a user is prompted to begin a transaction. Various transactions can be completed, including financial transactions (e.g., a payment for goods using a credit card or NFC tap), policy agreements (e.g., a user agreeing to terms of a policy, such as a privacy policy), contracts (e.g., an employment contract), real estate transactions, or others. As discussed above, the transactions can be electronically executed using or more electronic resources. For example, an electronic display such as a monitor, touch screen, or virtual reality/augmented reality (VR/AR) interface (e.g., of devices 105) can display characteristics (payment amounts, terms, conditions, etc.) of the transaction to a user, and the user can use the electronic display to complete (e.g., accept, furnish payment for, approve, etc.) the transaction.

Image data of the user is then collected while the transaction occurs. This is illustrated at operation 210. Thus, while the user is reviewing characteristics of the transaction, image data can capture user characteristics such as the user's face. In embodiments, multiple images (or a video) can be collected while the transaction is ongoing. In embodiments, the images can be collected from a camera (e.g., a front facing camera on a display device) configured to capture an anterior view of the user. In embodiments, additional data can be collected at operation 210, such as eye-tracking data (e.g., eye-attached tracking data and/or electric potential measurements, depending on the type of eye-tracking employed).

The image data (and other potential data) is then analyzed at operation 215. In embodiments, eye-tracking analysis can be performed using the image data and/or other data collected for the purpose of eye-tracking. For example, the image data and/or other data can be analyzed to determine saccadic eye movements, gaze shifts, blinks, fixations, scan paths, and other types of eye movements performed by a user when completing a transaction. Further, the image data can be used to determine a field of view (FOV) of the user. The FOV describes the user's visual limits including their central vision area and peripheral vision. Eye movements and FOV of the user can be used to determine: whether a user viewed a display depicting characteristics of the transaction, the specific locations (e.g., portions of the screen or passages of text) on the display the user viewed, and the amount of time the user viewed the display depicting characteristics of the transaction.

Various eye-tracking methodologies can be used, including eye-attached tracking (e.g., measuring eye movements using smart contact lenses), optical tracking (e.g., image based eye-tracking based on changes in reflection measured on the cornea), and electric potential measurement tracking (e.g., eye-tracking that measures electric potentials collected by electrodes placed around the eye). In embodiments, eye-tracking analyzation can utilize machine learning algorithms (e.g., supervised machine learning, neural networks, etc.).

In embodiments, at operation 215, facial recognition can be performed on the image data. This can be used to authenticate the user (e.g., to determine that the user matches a correct identity). In these embodiments, though not shown in FIG. 2, if the user is not authenticated, then the transaction can be denied (e.g., at operation 225).

Further, in some embodiments, at operation 215, an expression of the user can be derived from the image data using facial expression recognition. In these embodiments, though not shown in FIG. 2, the transaction can be denied (e.g., at operation 225) if the user matches to a particular expression (e.g., frustration, tiredness, anger, confusion, etc.) determined by a facial expression recognition algorithm.

A determination is then made whether the user viewed the display indicating characteristics of the transaction. This is illustrated at operation 220. As discussed above, eye-tracking of the user can be completed using the image data (and other potential eye-tracking data) collected at operation 210. The eye-tracking data can be used to determine: whether a user viewed a display depicting characteristics of the transaction, the specific locations (e.g., portions of the screen, specific sentences, words, paragraphs, or pages, etc.) on the display the user viewed, the FOV of the user, and the amount of time the user viewed the display (or portions thereof) depicting characteristics of the transaction. Thus, determining whether the user viewed the display can include: determining whether the user viewed the display over a threshold time period (e.g., 5 seconds, 10 seconds, etc.), determining whether the user viewed particular portions of the display (e.g., whether a fixation was detected in the center of the display), determining whether the user viewed particular sentences, words, paragraphs, pages, or other text passages on the display (e.g., based on measured saccades, fixations, and scan paths), and/or determining whether a field of view of the user overlaps with the display. Any of the above determinations can consider time thresholds.

If a determination is made that the user was not viewing the display indicating characteristics of the transaction, then the transaction is denied. This is illustrated at operation 225. The transaction can be denied in these instances, as if the user did not view the display, they may not have fully understood the transaction while it was occurring.

As an example, assume a user initiated a financial transaction using a magnetic strip, EMV chip, or NFC tap and the amount due erroneously read "$200.00" instead of "$20.00." In this instance, if the user read a display (e.g., on a financial transaction terminal device, such as a pin-pad credit card terminal) indicating the amount due, the user would likely not consent to the payment. However, if the user did not view the display, then the user could unintentionally approve the payment. As such, determining whether the user viewed the display indicating the payment amount (e.g., the transaction characteristic) can be beneficial for authorizing the payment, as it can prevent unintentional approval by the user.

As another example, assume a user initiated agreement with a privacy policy. In this instance, the privacy policy could include a set of terms, A-C, which the user is bound by if the policy is accepted. Assume that term "C" is unfavorable to the user, and the user would not consent to the privacy policy if he fully understood term "C." In this instance, determining whether the user viewed the term "C" can be beneficial for authorizing the transaction, as the user would likely not agree to the transaction having read term "C." Thus, in this example, operation 220 can include determining, using eye-tracking data, whether the user viewed term "C" (e.g., based on a measured scan path of the text of term "C" over a threshold time period").

In some embodiments, in response to denial at operation 225, additional authentication can be prompted to the user (e.g., a password, pin, or biometric reading). In some embodiments, denying the transaction at operation 225 can lead to re-prompting the user to begin the transaction again at operation 205. As such, in embodiments, operations 205-225 can continually loop until the transaction is authorized.

If a determination is made that the user viewed the display indicating characteristics of the transaction, then the transaction is authorized. This is illustrated at operation 230. In other words, when a determination is made that the user sufficiently viewed the display indicating the terms, payment amount, conditions, and/or other characteristics associated with a transaction, the transaction can be approved.

The aforementioned operations can be completed in any order and are not limited to those described. Additionally, some, all, or none of the aforementioned operations can be completed, while still remaining within the spirit and scope of the present disclosure. For example, in some embodiments, if insufficient or unusable data is collected at operation 210 such that eye-tracking, authentication, and/or facial expressions cannot be determined, a request can be made for additional image data collection prior to operation 215.

Figure 3:
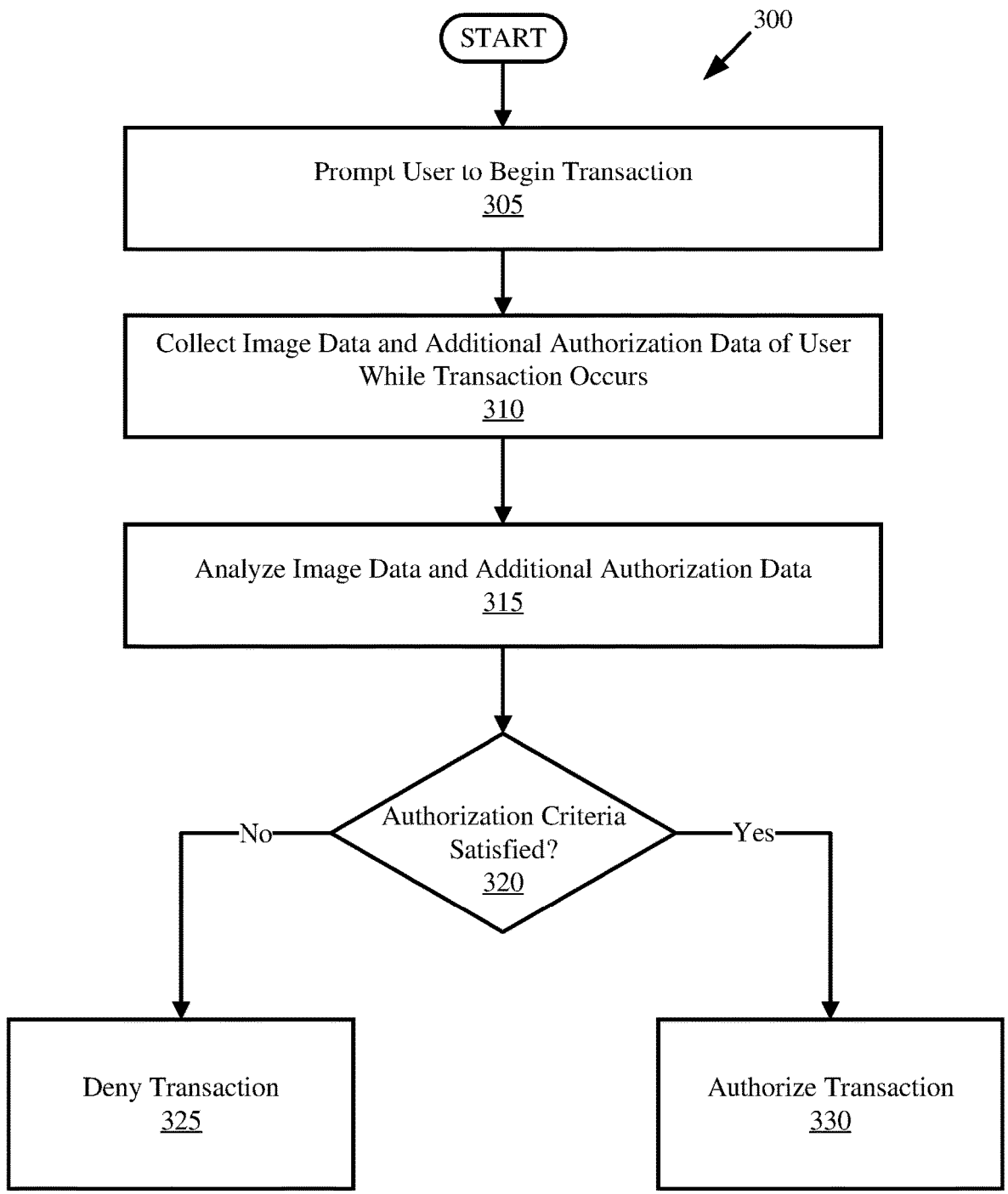
FIG. 3 is a flow-diagram illustrating an example method for authorizing a transaction based on image data and additional authorization data, in accordance with embodiments of the present disclosure.

Referring now to FIG. 3, shown is a flow diagram depicting an example method 300 for authorizing a transaction based on image data and additional authorization data, in accordance with embodiments of the present disclosure. One or more of the operations described in FIG. 3 can be executed by a computer system, such as devices 105 and server 135 of FIG. 1.

Method 300 initiates at operation 305, where a user is prompted to begin a transaction. This can be completed the same as, or substantially similar to, operation 205 of FIG. 2.

Image data and other authorization data of the user are then collected while the transaction occurs. This is illustrated at operation 310. The image data can be the same as, or substantially similar to, the image data collected at operation 210 of FIG. 2. For example, images of the anterior of a user and additional eye-tracking data (e.g., eye-attached tracking data and/or eye-tracking electric potential data) can be collected. Additional authorization data that can be collected to be considered for authorizing the transaction can include location data (e.g., the location the transaction parties reside), transaction history data (e.g., the number of times similar transactions have occurred), device security data (e.g., the type/security of a financial transaction terminal), characteristics of the transaction (e.g., amount due, specific terms/conditions), social media data, reputation of the parties involved in the transaction (e.g., reviews of the merchant/vendor that the user is conducting the transaction with), and others.

The image data and additional authorization data is then analyzed. This is illustrated at operation 315. Analyzing image data can be completed the same as, or substantially similar to, operation 215 of FIG. 2. For example, eye-tracking analyzation can be performed to determine eye movements such as saccades, fixations, scan paths, and blinks. Further, eye-tracking can be used to determine a field of view (FOV) of the user over time. This can be used to determine whether the user viewed the display indicating characteristics of the transaction, the specific portions or text of the display the user viewed, and/or the amount of time the user viewed the display (and specific portions thereof). Further, the image data can be used to authenticate the user using facial recognition algorithms and/or to determine facial expressions of the user using facial expression recognition algorithms.

Any suitable number of additional authorization factors can be analyzed. In embodiments, transaction history can be analyzed. For example, a number of previous transactions completed in a similar (or the same) location (e.g., a user previously completed five financial transactions in the same location), a number of previous transactions completed with similar parties (e.g., the user previously completed ten transactions with party "X"), and/or a number of completed transactions with similar devices can be determined. This can be utilized as transactions completed in familiar locations, with familiar parties, and/or with familiar devices may be regarded as relatively more secure.

In embodiments, a reputation of the third party the user is completing the transaction with can be determined. This can be completed by analyzing reviews, social media, and/or business ratings (e.g., using natural language processing (NLP) techniques, such as tonal analysis) of the third party. Parties with a bad reputation (e.g., low business ratings and/or negative reviews) can generally be regarded as relatively less secure.

In some embodiments, a determination of a security rating for a device facilitating the transaction can be determined (e.g., based on the overall security of the device). For example, a financial transaction terminal that can only accept magnetic strip payments can be regarded as relatively less trustworthy than a financial transaction terminal that can accept additional, more secure, payment methods such as EMV chips and NFC taps.

In embodiments, social media data of the user can be analyzed to aid with authorization. For example, text extracted from the user's social media profile can be analyzed (e.g., using NLP techniques) to aid with the authorization of the transaction. For example, if the user recently indicated in a social media post that they lost their mobile device, the transaction can be regarded as relatively less trustworthy, as it may be being conducted by a malicious party. As another example, if the user's social media was recently hacked (e.g., as indicated by suspicious social media posts), the transaction can be regarded as relatively less trustworthy.

A determination is then made whether authorization criteria are satisfied. This is illustrated at operation 320. Any suitable authorization criteria can be set. For example, authorization criteria can include determining whether a user viewed a display indicating characteristics of a transaction, as described with respect to operation 220 of FIG. 2. This can include determining whether the user viewed the display over a threshold time period, determining whether the user viewed specific portions or text passages of the display, and/or determining whether a FOV of the user encompasses the display. Thus, authorization criteria can consider whether the user is viewing a display indicating characteristics of a transaction.

Authorization criteria can further include determining whether the user is authenticated. In some embodiments, authenticating the user can be completed using facial recognition performed on one or more images collected from the user while the transaction was occurring (e.g., at operation 310). Additional authentication methods can also be implemented, such as pins, passwords, biometric authentication (e.g., voice, iris, or fingerprint authentication), security challenges, and others. In embodiments, a combination of authentication methods can be collectively considered (e.g., two or three factor authentication). Thus, the user can be authenticated while they are executing the transaction and the transaction authorization can be influenced based on the authentication. In some embodiments, if the user is not authenticated, then a determination can be made that authorization criteria are not satisfied at operation 320.

Authorization criteria can also include facial expression criteria. For example, authorization criteria can define that the transaction is not authorized in response to a particular facial expression (e.g., frustration, confusing, anger, tiredness, etc.) of the user being recognized while they were conducting the transaction. Thus, facial expression of the user can be determined while the user is executing the transaction and the transaction authorization (e.g., denial or approval) can be influenced based on the determined facial expression(s).

In embodiments, authorization criteria can be based on the location of the transaction. For example, if the user is operating in a particular geographic location, then the transaction can be either approved or declined based on the determined geographic location. Thus, location of the user can be determined while the user is executing the transaction and the transaction authorization can be influenced based on the determined location.

In embodiments, authorization criteria can be based on transaction history. For example, the number of transactions completed within the same location, with the same party (e.g., merchant), and/or using the same device can be considered when authorizing the transaction. As an example, authorization criteria can include a threshold that dictates that five previous transactions are required to be completed with a given party or in a given location in order to receive authorization. In this example, if the user completed four or less transactions with the given party or in the given location, the transaction can be denied. Thus, transaction history of the user can be determined while the user is executing the transaction and the transaction authorization can be influenced based on the transaction history.

In embodiments, authorization criteria can consider social media history. For example, NLP analysis can be conducted on the user's social media history and a risk score can be calculated based on the content within the social media history. The social media risk score can then be compared to a social media risk score threshold defined in the authorization criteria to determine whether to deny or authorize the transaction. Thus, social media history of the user can be determined while the user is executing the transaction and the transaction authorization can be influenced based on the social media history.

In embodiments, authorization criteria can consider a reputation of the party the user is conducting the transaction with. For example, a reputation score can be calculated for the party the user is conducting the transaction with based on reviews, social media, and/or business ratings of the party. The reputation score of the party can then be compared to a threshold reputation score set in the authorization criteria to determine whether to authorize or deny the transaction. Thus, reputation of the party the user is conducting the transaction with can be determined while the user is executing the transaction and the transaction authorization can be influenced based on the reputation of the party the user is conducting the transaction with.

In embodiments, authorization criteria can consider a security of a device facilitating the transaction. For example, a security score can be calculated based on the security of the device (e.g., the payment methods available to, whether the device is connected to a secure channel, whether the device utilizes encryption, etc.) facilitating the transaction. The security score can then be compared to a security threshold defined in the authorization criteria when determining whether to authorize or deny the transaction. Thus, device security of a device facilitating the transaction can be determined while the user is executing the transaction and the transaction authorization can be influenced based on the device security.

In embodiments, authorization criteria can consider characteristics of the transaction. For example, payment amount due may be considered as a criteria for authorization. In this example, if the payment amount due falls below a threshold (e.g., $50), the transaction may be authorized. Thus, characteristics of the transaction such as payment amount can be determined while the user is executing the transaction and the transaction authorization can be influenced based on the transaction characteristics.

In embodiments, multiple authorization criteria can be simultaneously considered when determining whether to authorize or deny the transaction. In some embodiments, a threshold number of matching criteria can be required to be met (e.g., satisfied) in order to authorize the transaction. For example, assume five authorization criteria: location, payment amount, transaction history, whether the user is viewing the display indicating characteristics of the transaction, and device security are considered when determining whether to authorize a transaction. Further assume that three out of the five authorization criteria are required to be satisfied in order to authorize the transaction. In this embodiment, if three or more of the five authorization criteria are satisfied, then the transaction can be authorized. However, if two or fewer of the five authorization criteria are satisfied, then the transaction can be denied.

In some embodiments, authorization criterion may be weighted and compiled into an authorization score such that the authorization score can be compared to an authorization threshold for the purposes of determining whether to approve or deny the transaction. For example, the authorization score can be calculated according to the following formula: authorization score=$f_1 \times w_1 + f_2 \times w_2 + \ldots f_n \times w_n$, where f is the score for each factor, w is the weight of each factor, and n is the number of total factors considered. As a detailed example, assume a first authorization factor $f_1$ (describing device security, with 1.00 being the highest security) is scored as 1.00 with a weight of 0.15, assume a second authorization factor $f_2$ (describing the likelihood that a user viewed a display facilitating a transaction, with 1.00 being the highest likelihood) is scored 0.75 with a weight of 0.65, and assume a third authorization factor $f_3$ (describing the reputation of a party the user is conducting the transaction with, with 1.00 being the highest reputation) is 0.25 with a weight of 0.20. In this example, the authorization score would be calculated as authorization score=(1.00× 0.15)+(0.75×0.65)+(0.25×0.20)=0.69. Thus, if authorization criteria define an authorization threshold of 0.70, then the transaction will be denied. If authorization criteria define an authorization threshold of 0.50, then the transaction will be approved. The above-referenced example is not intended to be limiting. Any suitable number of factors, selection of factors, calculation of factor scores and/or weights, and/or authorization threshold(s) can be defined without departing from the spirit and scope of the present disclosure.

If a determination is made that the authorization criteria are not satisfied at operation 320, then the transaction is denied. This is illustrated at operation 325. In some embodiments, in response to denial at operation 325, additional authentication can be prompted to the user (e.g., a password, pin, or biometric reading). In some embodiments, denying the transaction at operation 325 can lead to re-prompting the user to begin the transaction again at operation 305. As such, in embodiments, operations 305-325 can continually loop until the transaction is authorized. In some embodiments, denial at operation 325 can lead to consideration of one or more different authorization criteria at operation 320 in a future iteration.

If a determination is made that the authorization criteria are satisfied at operation 320, then the transaction is authorized. This is illustrated at operation 330. Authorizing the transaction can include approving/finalizing the transaction. For example, a payment being authorized can allow transfer of funds from the user to the third party.

The aforementioned operations can be completed in any order and are not limited to those described. Additionally, some, all, or none of the aforementioned operations can be completed, while still remaining within the spirit and scope of the present disclosure. For example, in some embodiments, if insufficient or unusable data is collected at operation 310 such that data cannot be properly analyzed at operation 315, a request can be made to collect additional data prior to operation 315.

Figure 4:
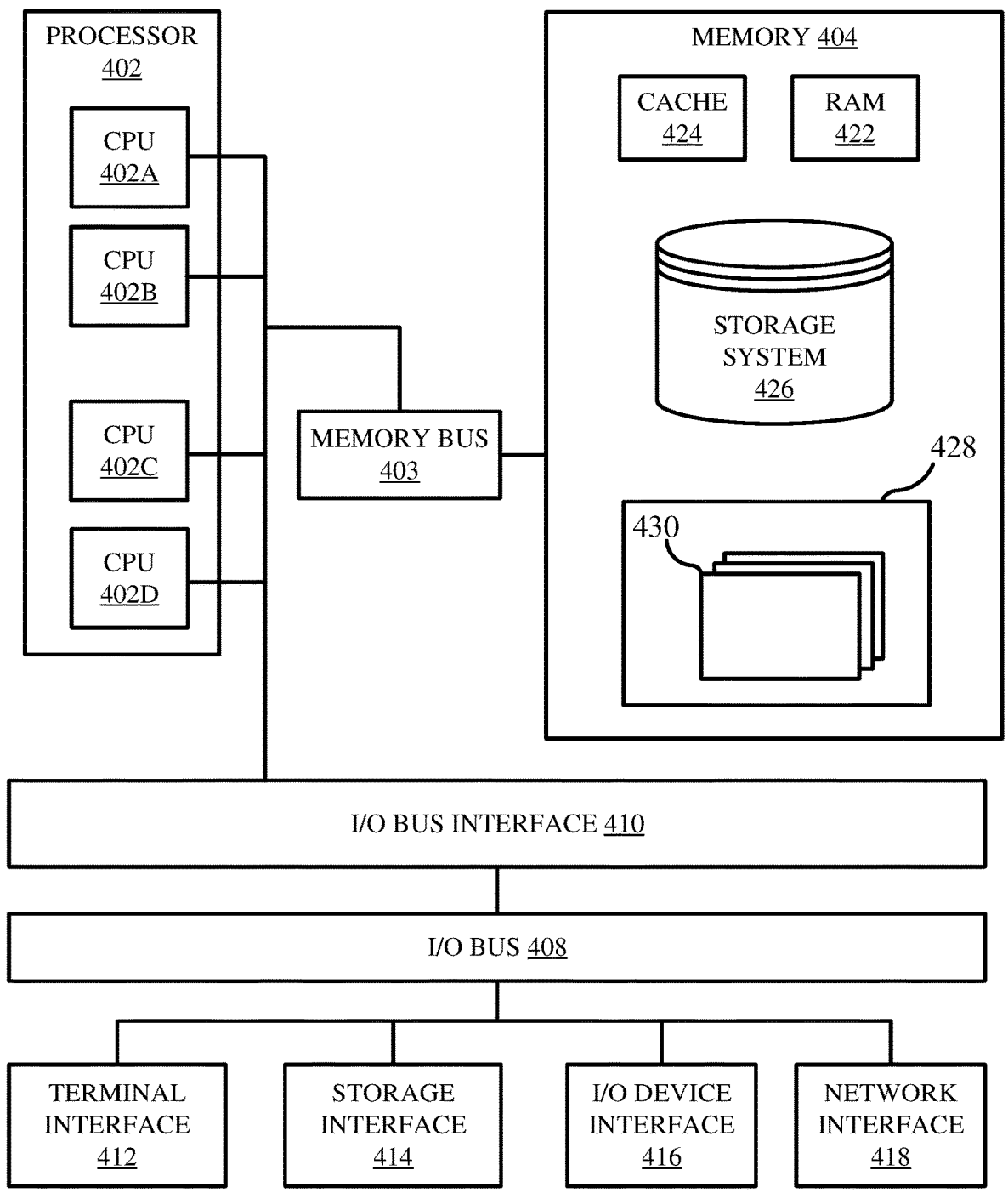
FIG. 4 is a high-level block diagram illustrating an example computer system that can be used in implementing one or more of the methods, tools, and modules, and any related functions described herein, in accordance with embodiments of the present disclosure.

Referring now to FIG. 4, shown is a high-level block diagram of an example computer system 401 that may possibly be utilized in various devices discussed herein (e.g., devices 105 and server 135) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402 (also referred to as processors herein), a memory 404, a terminal interface 412, a storage interface 414, an I/O (Input/Output) device interface 416, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

Memory 404 may include computer system readable media in the form of volatile memory, such as random-access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
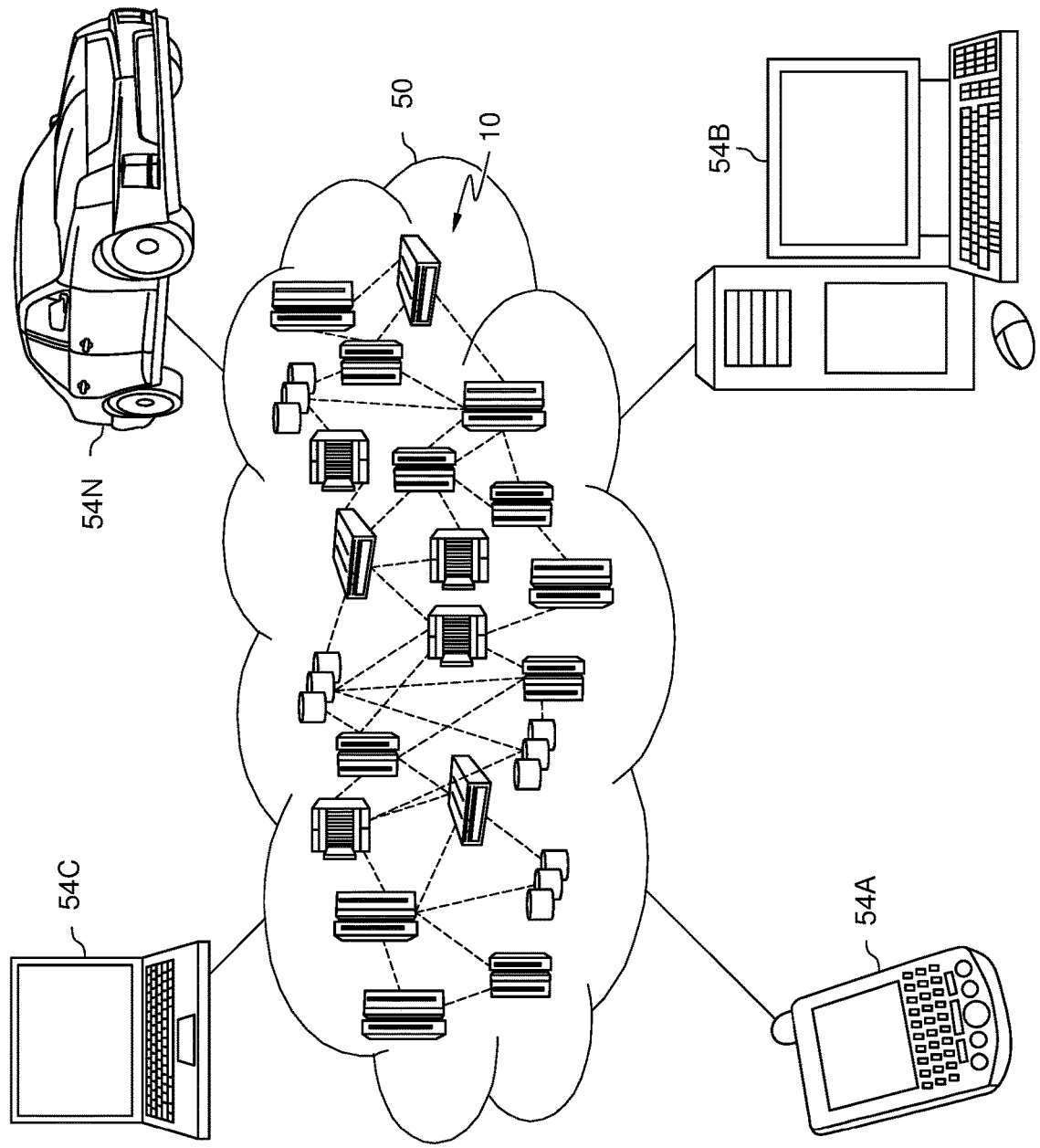
FIG. 5 is a diagram illustrating a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B (e.g., server 135), laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
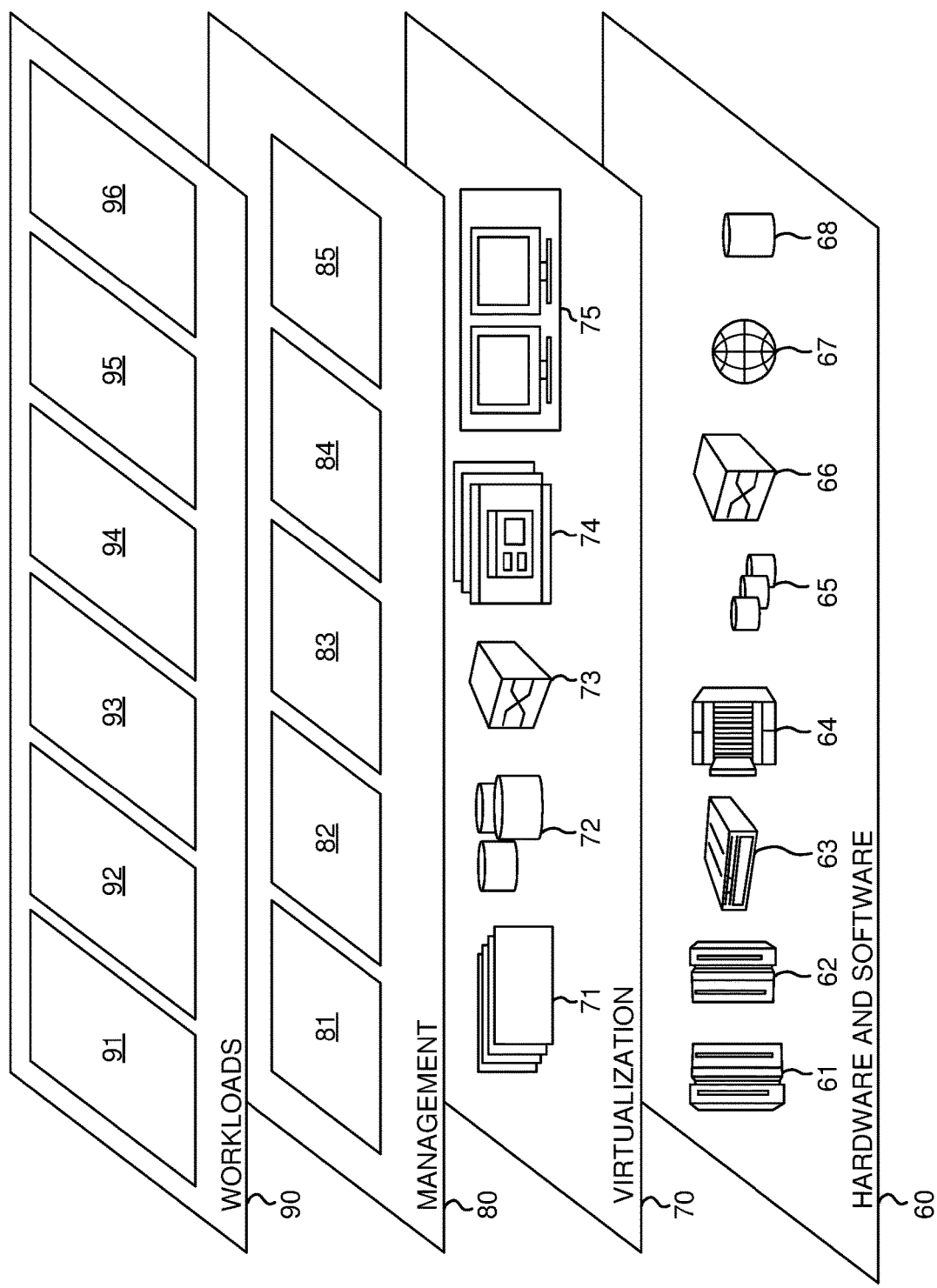
FIG. 6 is a block diagram illustrating abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and transaction authorization 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method to facilitate processing within an electronic transaction processing environment, the computer-implemented method comprising:
   determining, at a server, that a user has initiated execution of an electronic transaction on an electronic device separate from the server;
   obtaining, at the server based on the user initiating execution of the electronic transaction on the electronic device, electronic image data of the user while the electronic transaction involving the user is executing, the electronic image data being related to the user reviewing selected content of the electronic transaction on a display of the electronic device while the electronic transaction executes, wherein the electronic image data is received across a network from one or more cameras capturing the electronic image data related to the user reviewing the selected content of the electronic transaction on the display while the electronic transaction executes, and wherein the electronic image data comprising user-eye-tracking data is captured by one or more eye-tracking devices of the one or more cameras;
   electronically analyzing, by the server using one or more machine learning algorithms, the electronic image data of the user to determine a field of view (FOV) of the user and user eye movements indicative of a plurality of specific locations of the display the user viewed, and an amount of time the user viewed the plurality of specific locations of the display, wherein the determined FOV characterizing the user's visual limits comprises the user's central vision area and peripheral vision area;
   based on the determined FOV of the user, the determined plurality of specific locations of the display the user viewed, and the determined amount of time the user viewed the plurality of specific locations of the display, determining, by the server, that the user is viewing specific areas of the display indicating the selected content of the electronic transaction for a predetermined amount of time while the electronic transaction executes; and
   sending, by the server, an electronic authorization of the electronic transaction in response to determining based on the electronic image data that the user viewed the areas of the display indicating the selected content of the electronic transaction for at least the predetermined amount of time while the electronic transaction executes.

2. The computer-implemented method of claim 1, wherein the image data is further analyzed using facial recognition to authenticate the user prior to authorizing the electronic transaction.

3. The computer-implemented method of claim 1, wherein the content includes at least a payment amount.

4. The computer-implemented method of claim 1, wherein determining whether the user viewed the display indicating content characteristics of the electronic transaction comprises determining, using the user-eye-tracking data, that the user viewed text on the display indicating content characteristics of the electronic transaction.

5. The computer-implemented method of claim 1, wherein prior to authorizing the transaction, the method further comprises:
   determining a number of previous transactions completed in a same location as the electronic transaction; and
   comparing the number of previous transactions completed in the same location to a threshold,
   wherein the electronic transaction is authorized in response to determining that the user viewed the display indicating the content of the transaction and that the number of previous transactions completed in the same location exceeds the threshold.

6. The computer-implemented method of claim 1, wherein the electronic transaction is a financial electronic transaction, the device comprises a financial transaction terminal, and characteristics of the financial electronic transaction include a payment amount.

7. A system to facilitate processing within an electronic transaction processing environment, the system comprising:
   a memory storing computer instructions; and
   a processor configured to execute the computer instructions to perform a method comprising:
      determining, at a server, that a user has initiated execution of an electronic transaction on an electronic device separate from the server;
      obtaining, at the server based on the user initiating execution of the electronic transaction on the electronic device, electronic image data of the user while the electronic transaction involving the user is executing, the electronic image data being related to the user reviewing selected content of the electronic transaction on a display of the electronic device while the electronic transaction executes, wherein the electronic image data is received across a network from one or more cameras capturing the electronic image data related to the user reviewing the selected content of the electronic transaction on the display while the electronic transaction executes, and wherein the electronic image data comprising usereye-tracking data captured by one or more eye-tracking devices of the one or more cameras;

electronically analyzing, by the server using one or more machine learning algorithms, the electronic image data of the user to determine a field of view (FOV) of the user and user eye movements indicative of a plurality of specific locations of the display the user viewed, and an amount of time the user viewed the plurality of specific locations of the display, wherein the determined FOV characterizing the user's visual limits comprises the user's central vision area and peripheral vision area;

based on the determined FOV of the user, the determined plurality of specific locations of the display the user viewed, and the determined amount of time the user viewed the plurality of specific locations of the display, determining, by the server, that the user is viewing specific areas of the display indicating the selected content of the electronic transaction for a predetermined amount of time while the electronic transaction executes; and sending, by the server, an electronic authorization of the electronic transaction in response to determining based on the electronic image data that the user viewed the areas of the display indicating the selected content of the electronic transaction for at least the predetermined amount of time while the electronic transaction executes.

8. The system of claim 7, wherein the image data is further analyzed using facial recognition to authenticate the user prior to authorizing the electronic transaction.

9. The system of claim 7, wherein the content includes at least a payment amount.

10. The system of claim 7, wherein determining whether the user viewed the display indicating content characteristics of the electronic transaction comprises determining that the field of view (FOV) of the user overlaps with the display indicating content characteristics of the electronic transaction.

11. The system of claim 7, wherein prior to authorizing the electronic transaction, the method further comprises:

analyzing, using natural language processing, social media history of the user;

calculating a risk score based on the analysis; and comparing the risk score to a risk threshold, wherein the electronic transaction is authorized in response to determining that the user viewed the display indicating the content of the electronic transaction and that the risk score does not exceed the risk threshold.

12. The system of claim 7, wherein the electronic transaction is an electronic policy, the devices comprises a smart phone, and the content of the policy includes terms within the policy.

13. A computer program product to facilitate processing within an electronic transaction processing environment, the computer program product comprising a computer readable storage medium having program instructions embodied therewith, wherein the computer readable storage medium is not a transitory signal per se, the program instructions executable by a processor to cause the processor to perform a method comprising:

determining, at a server, that a user has initiated execution of an electronic transaction on an electronic device separate from the server;

obtaining, at the server based on the user initiating execution of the electronic transaction on the electronic device, electronic image data of the user while the electronic transaction involving the user is executing, the electronic image data being related to the user reviewing selected content of the electronic transaction on a display of the electronic device while the electronic transaction executes, wherein the electronic image data is received across a network from one or more cameras capturing the electronic image data related to the user reviewing the selected content of the electronic transaction on the display while the electronic transaction executes, and wherein the electronic image data comprising user-eye-tracking data captured by one or more eye-tracking devices of the one or more cameras;

electronically analyzing, by the server using one or more machine learning algorithms, the electronic image data of the user to determine a field of view (FOV) of the user and user eye movements indicative of a plurality of specific locations of the display the user viewed, and an amount of time the user viewed the plurality of specific locations of the display, wherein the determined FOV characterizing the user's visual limits comprises the user's central vision area and peripheral vision area;

based on the determined FOV of the user, the determined plurality of specific locations of the display the user viewed, and the determined amount of time the user viewed the plurality of specific locations of the display, determining, by the server, that the user is viewing specific areas of the display indicating the selected content of the electronic transaction for a predetermined amount of time while the electronic transaction executes; and sending, by the server, an electronic authorization of the electronic transaction in response to determining based on the electronic image data that the user viewed the areas of the display indicating the selected content of the electronic transaction for at least the predetermined amount of time while the electronic transaction executes.

14. The computer program product of claim 13, wherein the image data is further analyzed using facial recognition to authenticate the user prior to authorizing the electronic transaction.

15. The computer program product of claim 13, wherein the content includes at least a payment amount.

16. The computer program product of claim 13, wherein determining whether the user viewed the display indicating content of the electronic transaction includes:

determining, using the user-eye-tracking data, whether the user viewed a first word displayed on the display.

17. The computer program product of claim 13, wherein the electronic transaction is an electronic contract, the device comprises a smart phone, and the content of the contract includes conditions within the contract.

18. The computer-implemented method of claim 1, wherein the one or more eye-tracking devices are selected from the group consisting of eye-attached-tracking using smart contact lenses, optical tracking based on changes in reflection measured on a cornea, and electrical tracking of electric potentials collected by electrodes placed around at least one eye of the user.

19. The computer-implemented method of claim 1, further comprising: electronically prompting, by the server, the user to initiate the electronic transaction again based on determining from the electronic image data that the user did not view all areas of the display indicating the selected content of the electronic transaction while the electronic transaction occurs.

* * * * *